United States Patent [19]

Perazzoli, Jr. et al.

[11] Patent Number: 5,920,895
[45] Date of Patent: Jul. 6, 1999

[54] MAPPED FILE INPUT/OUTPUT WITH DELAYED ZEROING

[75] Inventors: Frank Louis Perazzoli, Jr., Redmond; Thomas J. Miller, Bellevue, both of Wash.

[73] Assignee: Microsoft Corporation, Redmond, Wash.

[21] Appl. No.: 08/427,950

[22] Filed: Apr. 24, 1995

[51] Int. Cl.[6] .................................................... G06F 12/14
[52] U.S. Cl. .......................... 711/163; 711/118; 395/186; 395/651
[58] Field of Search .................................... 395/490, 491, 395/493, 186, 651, 652, 653, 670, 674, 412, 413; 380/4; 711/163, 164, 166, 202, 203, 118

[56] References Cited

U.S. PATENT DOCUMENTS

| 4,942,606 | 7/1990 | Kaiser et al. ............................. 380/4 |
| 5,353,410 | 10/1994 | Macon, Jr. et al. ................... 395/471 |
| 5,375,243 | 12/1994 | Parzych et al. ................... 395/188.01 |

OTHER PUBLICATIONS

Curt Schimmel "UNIX Systems for Modern Architectures Symmetric Multiprocessing and Caching for Kernel Programmers", Addison–Wesley Publishing Co., 1994, pp. 139–140, 1994.

Andrew S. Tanenbaum, "Modern Operating Systems", 1992, Prentice Hall, Inc., pp. 18–26 and pp. 180–202.

*Inside the Windows NT File System*, Helen Custer, Microsoft Press, 1994.

*Inside Windows NT*, Chapters Two, Six and Eight, Helen Custer, Microsoft Press, 1993.

*Primary Examiner*—Eddie P. Chan
*Assistant Examiner*—Hong C. Kim
*Attorney, Agent, or Firm*—Klarquist Sparkman Campbell Leigh & Whinston, LLP

[57] ABSTRACT

The efficiency of writing files that are cached using mapped file I/O is improved by suppressing zeroing of uninitialized data in cached pages of a file until the file is mapped by a user mode thread. In an operating system where paging operations are controlled by a virtual memory manager and memory based caching using mapped file I/O is administered by a cache manager, suppressing zeroing of mapped files on writes is implemented by a set of internal operating system interfaces for communications between the virtual memory manager and the cache manager. When a file being cached is not yet mapped by a user mode thread, the cache manager tracks the extent to which a cache page of the file is written so that any uninitialized data in the cache page can later be zeroed when the file is mapped by a user mode thread.

17 Claims, 5 Drawing Sheets

MAPPED FILE INPUT/OUTPUT WITH DELAYED ZEROING

FIELD OF THE INVENTION

This invention relates generally to mapped file input/output, and more particularly relates to efficient security measures for systems that utilize mapped file input/output.

BACKGROUND OF THE INVENTION

Computer systems, in general, include a main memory (also known as the computer's "physical memory") for storing data and instructions of currently executing programs ("process threads"). Typically, the main memory is organized as a plurality of sequentially numbered storage units, each containing a fixed size quantity (e.g. an 8-bit byte in byte oriented computers). The numbering of the storage units (typically in binary or hexadecimal values starting from zero up to the total number of storage units minus one) serve as addresses by which a particular storage unit can be referenced for reading or writing the data contained therein. The set of numbers by which the storage units are addressed is known as the "physical address space" of the main memory. Main memory typically is realized using semiconductor memory which provides fast, random-access to the various storage units, but requires constant application of electrical energy for operation (i.e. the memory is volatile).

Computer systems also typically provide one or more secondary storage devices which are generally slower than the main memory, but have a much greater storage capacity than the main memory. The secondary storage devices typically store data on a magnetic or optical media that is non-volatile, such as a hard disk. Secondary storage devices generally store data in the form of files or sequential data streams.

Due to the greater speed at which data can be accessed in main memory, data that is currently in use by process threads running on the computer system is desirably stored in the main memory. Due to the smaller storage capacity of the main memory, however, main memory may be unable to store all the information needed by process threads. Accordingly, data that is no longer currently in use is desirably removed from the main memory, or moved from the main memory to the secondary storage devices.

Techniques to efficiently manage the use of the main memory ("memory management techniques") by process threads are conventionally known. One standard technique, commonly known as "virtual memory," is implemented by many operating systems, usually in cooperation with a computer system's processor. Virtual memory techniques create a separate address space, referred to as the "virtual address space," by which process threads access data in memory. The operating system and processor translates or maps a subset of the virtual addresses in the virtual address space to actual physical addresses in the main memory's physical address space. When a process thread reads or writes data to a virtual address in its virtual address space, the operating system and/or processor translates the virtual address to a corresponding physical address of a storage unit in the main memory where the data is to be read or written. In a first version (version 3.1) of Microsoft Corporation's Windows NT operating system (Windows NT 3.1), for example, a component called the virtual memory manager implements a separate virtual address space for each process thread in cooperation with the computer's processor.

Since the virtual address space is typically much larger than the physical address space of the main memory, only a subset of the virtual address space can be resident in main memory at one time. Data not resident in main memory is temporarily stored in a "backing store" or "paging" file on the computer's hard disk. When the main memory becomes over committed (i.e. its storage capacity is exceeded), the operating system begins swapping some of the contents of the main memory to the "backing store" file. When the data is again required by a process thread, the operating system transfers the data back into the main memory from the backing store file. By swapping data that is no longer needed to the hard disk, virtual memory allows programmers to create and run programs that require more storage capacity than is available in the main memory alone.

Moving data between the main memory and the hard disk is most efficiently performed in larger size blocks (as compared to bytes or words). Accordingly, virtual memory techniques generally perform swapping in large size blocks. Microsoft Corporation's Windows NT 3.1 operating system, for example, divides the virtual address space of each process thread into equal size blocks referred to as "pages." The main memory also is divided into similar size blocks called "page frames," which contain the pages mapped into the main memory. The page size in the Windows NT 3.1 operating system is 4 KB, 8 KB, 16 KB, 32 KB, or 64 KB, depending on the requirements of the particular computer on which it is run.

In the Windows NT 3.1 operating system, each process has a set of pages from its virtual address space that are present in physical memory at any given time. Pages that are currently in the main memory and immediately available are termed "valid pages." Pages that are stored on disk (or in memory but not immediately available) are called "invalid pages." When an executing thread accesses a virtual address in a page marked invalid, the processor issues a system trap called a "page fault." The operating system then locates the required page on the hard disk and loads it into a free page frame in the main memory. When the number of available page frames runs low, the virtual memory system selects page frames to free and copies their contents to the hard disk. This activity, known as "paging," is imperceptible to the programmer.

A technique similar to virtual memory, known as mapped file input/output (I/O), can be used to access data in files stored in secondary storage devices. Mapped file I/O refers to the ability to view a file residing on disk as part of a process thread's virtual memory (i.e. normal files other than the paging file are mapped into a portion of the process thread's virtual memory). A process thread using mapped file I/O accesses the file as a large array in its virtual memory instead of buffering data or performing disk I/O. The process thread performs memory accesses using virtual addresses to read the file, and the operating system uses its paging mechanism to load the correct page from the disk file. If the application writes to the portion of its virtual address space which is mapped to the file, the operating system writes the changes back to the file as part of normal paging. Because writing to the main memory is generally much faster than writing to the secondary storage devices, mapped file I/O potentially speeds the execution of applications that perform a lot of file I/O or that access portions of many different files.

The Windows NT 3.1 operating system includes a component, the cache manager, which uses mapped file I/O to administer a memory-based cache. The cache manager places frequently accessed file data in memory in order to provide better response time for I/O bound programs. When a process thread opens and uses a file, the file system notifies the cache manager which maps the file to virtual memory pages using the functionality of the virtual memory manager. As the process thread uses the file, the virtual memory manager brings accessed pages of the file from the hard disk into the main memory. During paging, the virtual memory manager flushes written pages back to the file on the hard disk. This cache can vary in size depending on how much memory is available. The paging functionality of the virtual memory manager automatically expands the size of the cache based on conventional working set techniques when plenty of memory is available, and shrinks the cache when it needs free pages.

The advantage of mapped file I/O is that entire sections of the hard disk containing a mapped file can be materialized into memory at a time, and thereby made available to an I/O system (an operating system component that manages device I/O). Also, process threads of user applications that map files see the same pages of file data that the I/O system is using, so data coherency (i.e., multiple accessors always seeing the current data) between the I/O system and user mapped files is automatic.

A potential problem arises when files are created or extended in the cache. In particular, as new pages of a file are written for the first time, there is no initial data resident on disk for these new pages, so the I/O system logically selects free pages in memory to receive the new file data prior to writing it to disk. Yet, as the I/O system adds these pages to a file, they become immediately visible to applications via mapped file access. This poses a potential security risk if the user applications are allowed to see data that previously existed in these free memory pages. (Free memory pages contain data from the last time the pages were used, which could be data from another file, private system data, system code, etc.) If free pages are made immediately visible in a file prior to being completely written with new data, then the previous data in the page becomes visible to all accessors including user applications via mapped file access.

One way to fix this problem is for the I/O system to insure that each page is zeroed out before it becomes visible in the file. However, this is very expensive, as all pages added to a file would then have to be written twice, once with zeros and once as they receive new file data.

In the first version of the Windows NT operating system, Version 3.1, user applications were, in fact, prevented from accessing uninitialized data in the cache by having the I/O system prezero new pages before allowing them to become visible for mapped file access. As mentioned, this hurt performance by causing the pages to be written twice. Zeroing particularly affects I/O performance when writing small files. (This problem therefore is sometimes referred to as the small file writes problem.) When writing an 8-byte long file, for example, the Windows NT 3.1 operating system first writes 4 KB of zeroes over a mapped page, then the 8-bytes of file data (i.e. a total of 4,104 bytes). This is an increase of 513 times as many bytes as the file data alone, for the first write to a new page.

SUMMARY OF THE INVENTION

In accordance with the invention, zeroing of mapped file I/O pages is delayed until the file is mapped by a user mode process thread. A large percentage of files are mapped only by operating system components that run in a kernel mode of operation. Operating system components, and other kernel mode process threads, do not pose any security risk by having access to uninitialized data in mapped file I/O pages. By delaying zeroing of mapped file I/O pages until a user mode process thread maps the file, the I/O performance for files accessed exclusively by kernel mode process threads therefore is substantially improved without compromising security. For example, the first 8-bytes can be written to a new page of a file that is not mapped by a user mode process without ever zeroing the uninitialized data on the page (i.e. by writing only the 8-bytes of file data into the page).

According to a further aspect of the invention, a portion of a mapped file I/O page that contains file data is tracked for later zeroing when mapped by a user mode process thread.

In a preferred embodiment of the invention, delayed zeroing of mapped file I/O pages is implemented in an operating system comprising a cache manager that administers memory-based caching of files using mapped file I/O and a virtual memory manager that manages paging of virtual memory. The virtual memory manager provides an internal interface that is called by the cache manager to have the virtual memory manager map a file to virtual memory. The interface includes a flag which permits selectively suppressing zeroing of uninitialized data on the page by the virtual memory manager. If the page is not mapped by a user mode process thread, the virtual memory manager suppresses zeroing of the uninitialized data on the page.

Additionally, the cache manager provides an interface callable by the virtual memory manager when a mapped file I/O page is later mapped by a user mode thread to cause the cache manager to zero the uninitialized portion of the page.

Additional features and advantages of the invention will be made apparent from the following detailed description of a preferred embodiment which proceeds with reference to the accompanying drawings.

DETAILED DESCRIPTION OF THE PREFERRED EMBODIMENTS

Figure 1:
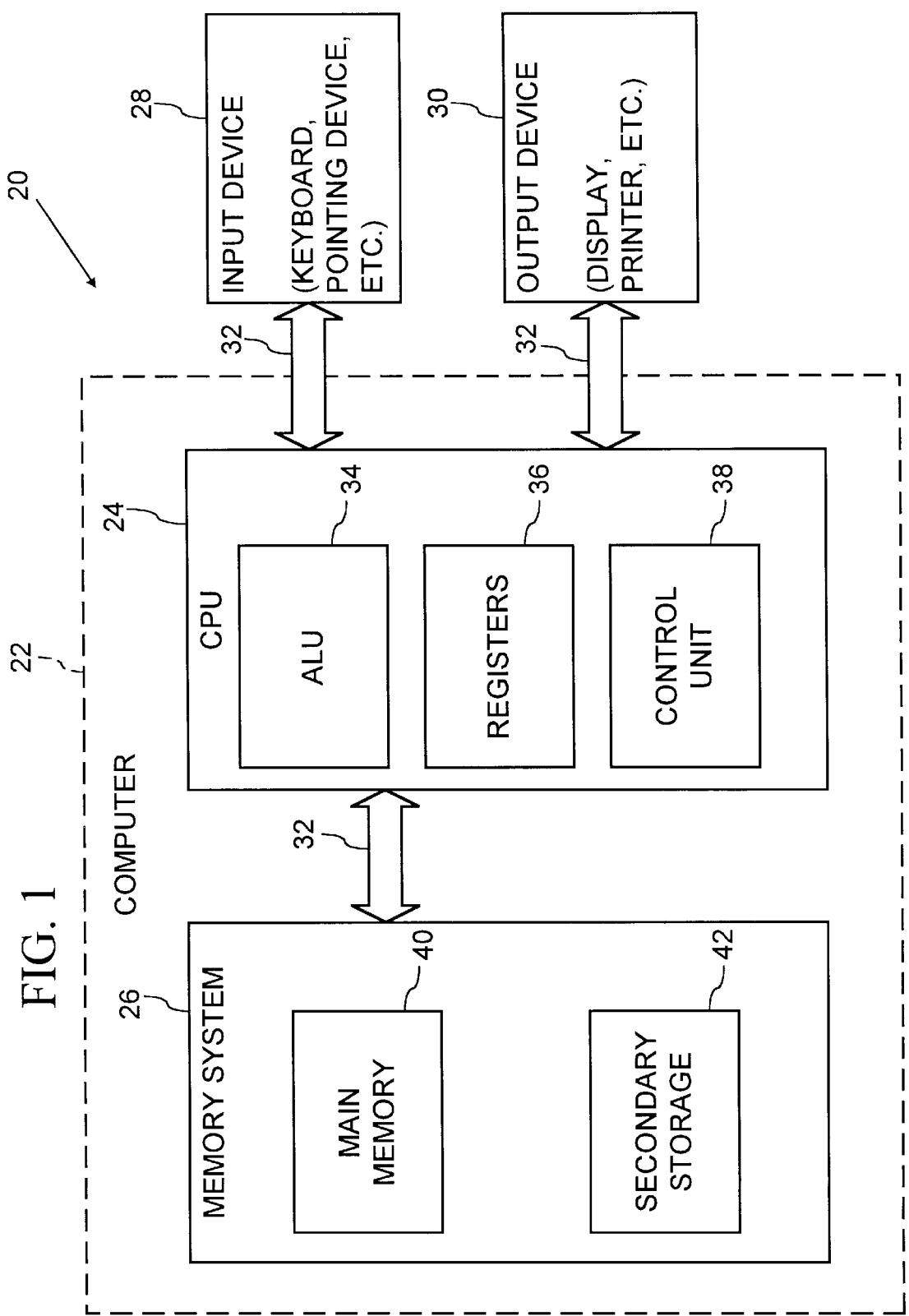
FIG. 1 is a block diagram of a computer system that may be used to implement a method and apparatus embodying the invention.

Referring to FIG. 1, an operating environment for a preferred embodiment of the present invention is a computer system 20 with a computer 22 that comprises at least one high speed processing unit (CPU) 24, in conjunction with a memory system 26, an input device 28, and an output device 30. These elements are interconnected by a bus structure 32.

The illustrated CPU 24 is of familiar design and includes an ALU 34 for performing computations, a collection of registers 36 for temporary storage of data and instructions, and a control unit 38 for controlling operation of the system 20. Any of a variety of processors, including at least those from Digital Equipment, IBM, Sun, MIPS, Motorola, NEC, Intel, Cyrix, AMD, and Nexgen, are equally preferred for CPU 24. (The preferred embodiment of the invention is in an operating system designed to be portable to any of these processing platforms.)

The memory system 26 includes main memory 40 and secondary storage 42. Illustrated main memory 40 takes the form of semiconductor RAM memory. Secondary storage 42 takes the form of long term storage, such as ROM, optical or magnetic disks, flash memory, or tape. Those skilled in the art will recognize that memory 26 can comprise a variety of alternative components.

The input and output devices 28, 30 are also familiar. The input device 28 can comprise a keyboard, a mouse, a physical transducer (e.g. a microphone), etc. The output device 30 can comprise a display, a printer, a transducer (e.g. a speaker), etc. Some devices, such as a network interface or a modem, can be used as input and/or output devices.

As is familiar to those skilled in the art, the computer system 20 further includes an operating system and at least one application program. The operating system is the set of software which controls the computer system's operation and the allocation of resources. The application program is the set of software that performs a task desired by the user, making use of computer resources made available through the operating system. Both are resident in the illustrated memory system 26.

In accordance with the practices of persons skilled in the art of computer programming, the present invention is described below with reference to symbolic representations of operations that are performed by computer system 20, unless indicated otherwise. Such operations are sometimes referred to as being computer-executed. It will be appreciated that the operations which are symbolically represented include the manipulation by CPU 24 of electrical signals representing data bits and the maintenance of data bits at memory locations in memory system 26, as well as other processing of signals. The memory locations where data bits are maintained are physical locations that have particular electrical, magnetic, or optical properties corresponding to the data bits.

The present invention is illustrated in the context of Microsoft Corporation's Windows NT operating system. For a complete discussion of the Windows NT operating system see *Inside Windows NT,* by Helen Custer, Microsoft Press, 2993. A brief overview of part of the general operation of the Windows NT operating system and associated terminology is provided below before discussing the details of the preferred embodiment.

Figure 2:
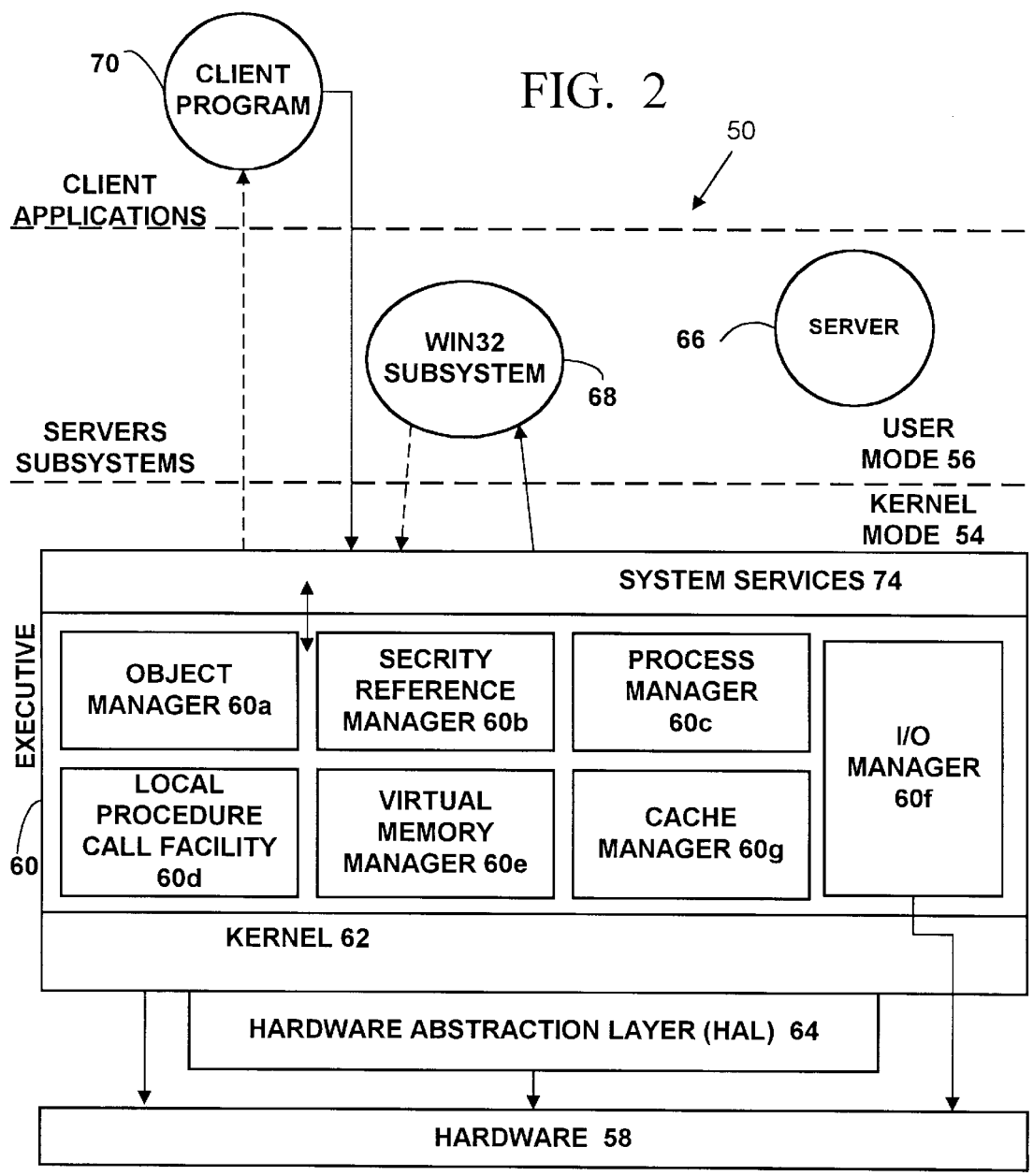
FIG. 2 is a block diagram of an operating system architecture within a computer system such as shown in FIG. 1.

Referring to FIG. 2, the Windows NT operating system 50 is divided into two parts: the "kernel mode" 54 and the "user mode" 56.

The kernel mode 54 is a privileged processor mode in which the operating system code runs with access to system data and to the hardware. Depicted as part of the kernel mode 54 is the physical computer hardware 58 itself (e.g. part or all of the computer system 20 of FIG. 1), since it is only through the kernel mode that these resources can be accessed.

The portion of the operating system depicted as part of the kernel mode 54 is called the "executive" 60. The executive comprises modules that implement object (resource) management 60a, portions of the security system 60b, process manager 60c, interprocess communication 60d, virtual memory management 60e, I/O manager 60f, and the cache manager 60g.

The bottommost portions of the executive are called the "kernel" 62 and the "hardware abstraction layer" ("HAL") 64. The kernel 62 performs low-level operating system functions, such as thread scheduling, interrupt and exception dispatching, and multiprocessor synchronization. The hardware abstraction layer (HAL) 64 is a layer of code that isolates the kernel and the rest of the executive from platform-specific hardware differences. The HAL thus hides hardware-dependent details such as I/O interfaces, interrupt controllers, and multiprocessor communication mechanisms. Rather than access hardware directly, the components of the executive maintain portability by calling the HAL routine when platform-specific information is needed.

The user mode 56 is a nonprivileged processor mode in which subsystems/servers (e.g. servers 66 and Win32 subsystem 68) and application programs 70 and client programs 72 (hereafter "applications" and "clients," respectively) run, with a limited set of interfaces available and with limited access to system data.

Each subsystem 68 implements a single set of services, for example, memory services, process creation services, or processor scheduling services. The illustrated Win32 subsystem 68, for example, makes a 32-bit application programming interface (API) available to application programs. Each subsystem runs in user mode, executing a processing loop that checks whether a client 72 has requested one of its services. The client 72 may be another operating system component or an application program.

The executive 60 is a series of components, each of which implements two sets of functions: system services 74, which can be called from client programs as well as other executive components, and internal routines, which are available only to components within the executive. System services include (a) the object manager 60a, which is responsible for creating, managing and deleting objects (objects are abstract data structures used to represent operating system resources); (b) the process manager 60b, which is responsible for creating/terminating processes and threads, and for suspending/resuming execution of threads; and (c) the I/O manager 60f, which is responsible for implementing device-independent I/O facilities as well as device-dependent I/O facilities.

The client 72 requests a service by sending a message to a subsystem 68, as represented by the solid arrow between the depicted Win32 client 72 and the Win32 subsystem 68. The message passes through system services 74 and the executive 60, which delivers the message to the subsystem. After the subsystem 68 performs the operation, the results are passed to the client 72 in another message, as represented by the dotted arrow between the Win32 subsystem and the Win32 client.

In Windows NT, shareable resources, such as files, memory, processes and threads, are implemented as "objects" and are accessed by using "object services." As is well known in the art, an "object" is a data structure whose physical format is hidden behind a type definition. Data structures, also referred to as records or formats, are organization schemes applied to data so that it can be interpreted and so that specific operations can be performed on that data. Such data structures impose a physical organization on the collection of data stored within computer memory and represent specific electrical or magnetic elements.

An "object type," also called an "object class," comprises a data-type, services that operate on instances of the data type, and a set of object attributes. An "object attribute" is a field of data in an object that partially defines that object's state. An "object service" implements and manipulates objects, usually by reading or changing the object attributes. As noted, in the preferred embodiment, the object manager 60a is responsible for creating, deleting, protecting, and tracking user application visible objects.

The Windows NT operating system allows users to execute more than one program at a time by organizing the many tasks that it must perform into "processes" 66–72. The operating system allocates a portion of the computer's resources to each process and ensures that each process's program is dispatched for execution at the appropriate time and in the appropriate order. In the preferred embodiment, this function is implemented by the process manager 60c.

In the preferred embodiment, processes are implemented as objects. A process object comprises the following elements:

an executable program;

a private address space;

system resources (e.g., communication ports and files) that the operating system allocates to the process as the program executes; and at least one "thread of execution."

A "thread" is the entity within a process that the kernel schedules for execution. As is well known in the art, each thread has an associated "context" which is the volatile data associated with the execution of the thread. A thread's context includes the contents of system registers and the virtual address belonging to the thread's process. Thus, the actual data comprising a thread's context varies as it executes.

Periodically, a thread may stop executing while, for example, a slow I/O device completes a data transfer or while another thread is using a resource it needs. Because it would be inefficient to have the processor remain idle while the thread is waiting, a multi-tasking operating system will switch the processor's execution from one thread to another in order to take advantage of processor cycles that otherwise would be wasted. This procedure is referred to as "context switching." When the I/O device completes its data transfer or when a resource needed by the thread becomes available, the operating system will eventually perform another context switch back to the original thread. Because of the speed of the processor, both of the threads appear to the user to execute at the same time.

Threads that execute programs in the user mode, such as the server 66, the subsystem 68, the application program 70, and the client program 72, are herein referred to as user mode threads. Threads that execute only operating system components in kernel mode are herein referred to as kernel mode threads.

Figure 3:
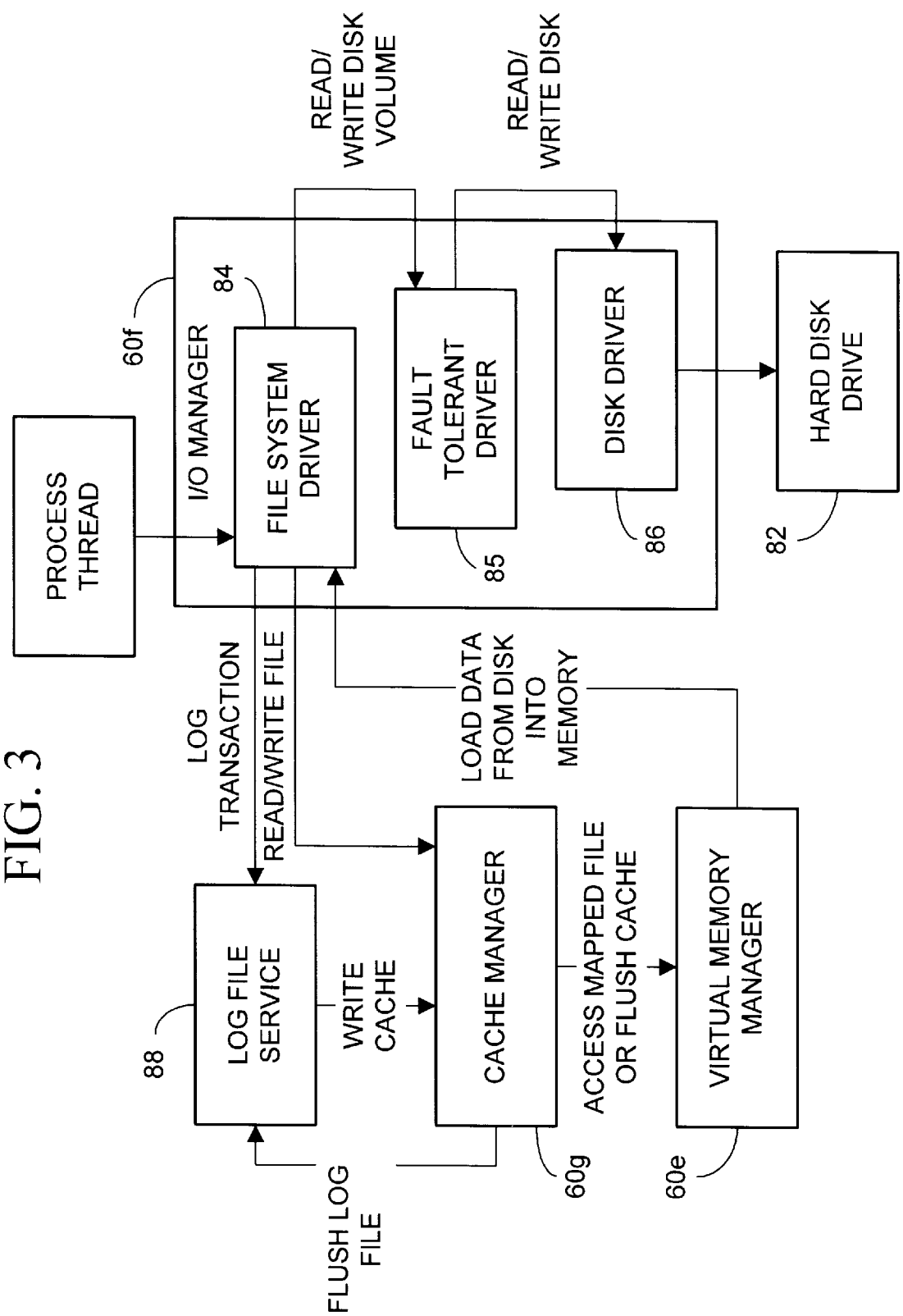
FIG. 3 is a block diagram of a portion of the operating system in FIG. 2 comprising a cache manager and a virtual memory manager for caching of files from secondary storage using mapped file I/O.

Referring now to FIG. 3, a portion 80 of the operating system 50 that implements mapped file I/O comprises the virtual memory manager 60e, the I/O manager 60f, and a cache manager 60g. Virtual memory manager 60e operates to map pages of a thread's virtual memory address space to page frames of the main memory 40 (FIG. 1), and to control paging of virtual memory pages to files stored on the secondary storage devices 42 (FIG. 1), such as a hard disk drive 82.

The I/O manager 60f is implemented using layered drivers, comprising a file system driver 84, a fault tolerant driver 85, and a hard disk driver 86, so as to encapsulate functionality in separately loadable and unloadable drivers. The layered drivers 84–86 pass I/O requests to each other by calling the I/O manager 60f. Requests from operating system components and user mode programs to read or write data on the hard disk are passed through each layer to the disk driver 86 which handles direct communication with the hard disk drive 82. Relying on the I/O manager 60f as intermediary, allows each driver to maintain independence so that it can be loaded or unloaded without affecting other drivers. The I/O manager 60f also can include other file system drivers, such as an NTFS, FAT, HPFS, or network file system drivers for reading and writing to secondary storage devices that utilize such files systems.

The file system driver 84 additionally interacts with the virtual memory manager 60e, the cache manager 60g, and a log file service 88. The log file service 88 is a component of the executive that provides services for maintaining a log file of disk writes. The log file is used to recover files and file system data in the event of a system failure.

The cache manager 60g provides system-wide caching services for file system drivers 84. The file system driver 84 calls the cache manager 60g to read and write cached files. The cache manager calls the virtual memory manager 60f to map the cached files into virtual memory, read and write the files, and flush modifications back to the hard disk drive 82.

As shown in FIG. 3, the I/O system 60f receives requests from threads to read or write data in a file. The file system 84 performs file I/O by calling the cache manager 60g. The cache manager 60g, in turn, calls the virtual memory manager 60e to load a section of the file that is being read or written into a cache page in the main memory 40 (FIG. 1). After the virtual memory manager has loaded the file data into the cache page in a call to the file system 84, the cache manager 60g reads or writes into the cache page. Eventually, the virtual memory manager 60e will flush a written cache page back to the file to which the cache page is mapped.

Figure 4:
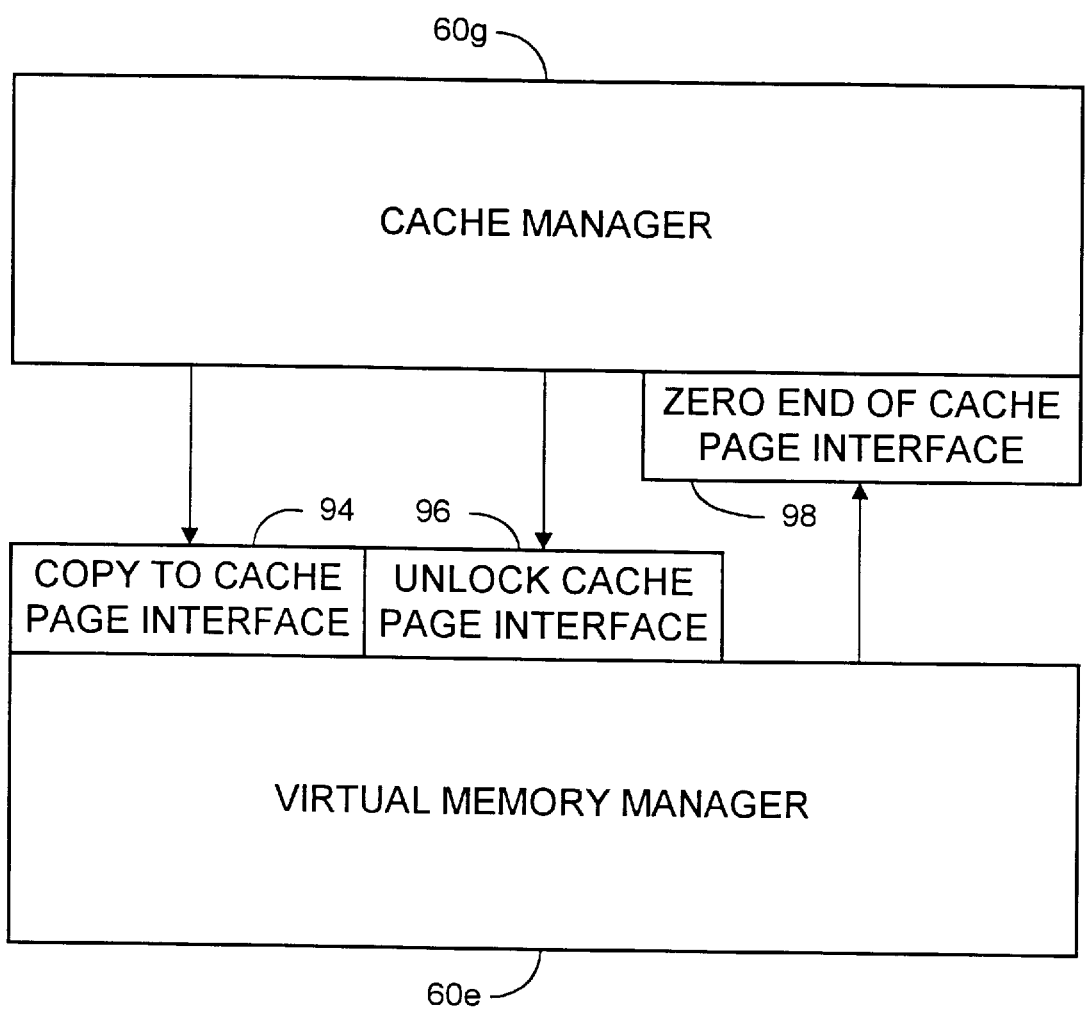
FIG. 4 is a block diagram of internal functions of the cache manager and virtual memory manager of FIG. 3 for delayed zeroing of mapped file I/O according to the invention.

Referring now to FIG. 4, the cache manager 60g and the virtual memory manager 60e provide efficient security measures against reading of uninitialized data by user mode process threads through use of internal functions calls between the cache manager 60g and the virtual memory manager 60e. The virtual memory manager 60e provides a copy-to-cache-page interface 94 and an unlock-cache-page interface 96 for calling by the cache manager 60g. The cache manager 60g provides a zero-end-of-cache-page interface 98 that is called by the virtual memory manager 60e.

When a process thread requests to write a file, the cache manager 60g calls the copy-to-cache-page interface 94 of the virtual memory manager 60e. With this call, the cache manager 60g causes the virtual memory manager 60e to copy data into a cache page that is mapped to a section of a file. In the preferred embodiment, the copy-to-cache-page interface 94 is defined as follows (in C programming language syntax):

```
int MmCopyToCachePage(
    PageAddress,
    SourceBuffer,
    BufferOffset,
    Length,
    DontZero)
```

In its call to the copy-to-cache-page interface 94, the cache manager 60g passes PageAddress, SourceBuffer, BufferOffset, Length, and DontZero parameters. The PageAddress parameter specifies an address of the cache page being written. The SourceBuffer and BufferOffset parameters point to data in the main memory which is to be written to the cache page. The length parameter specifies the length in bytes of the data being written.

The DontZero parameter is a Boolean value which the cache manager 60g sets to TRUE to optimize file write operations. When the DontZero parameter is set to TRUE, the virtual memory manager 60e suppresses zeroing of the uninitialized data on the cache page unless the cache page has already been mapped by a user mode thread. The virtual memory manager 60e informs the cache manager 60g whether zeroing was suppressed by the return value of the copy-to-cache-page interface 94.

The possible return values of the copy-to-cache-page interface 94 are Success and CachePageLocked. When the cache page is already mapped by a user mode thread, the virtual memory manager 60e zeroes the uninitialized data on the cache page, and returns the Success value to indicate zeroing was performed.

If the cache page is not yet mapped by a user mode thread, the virtual memory manager 60e instead returns the CachePageLocked value. This value indicates that the virtual memory manager 60e has not zeroed uninitialized data on the cache page, and has instead locked the cache page in memory to prevent writing of the cache page to the mapped file.

Figure 5:
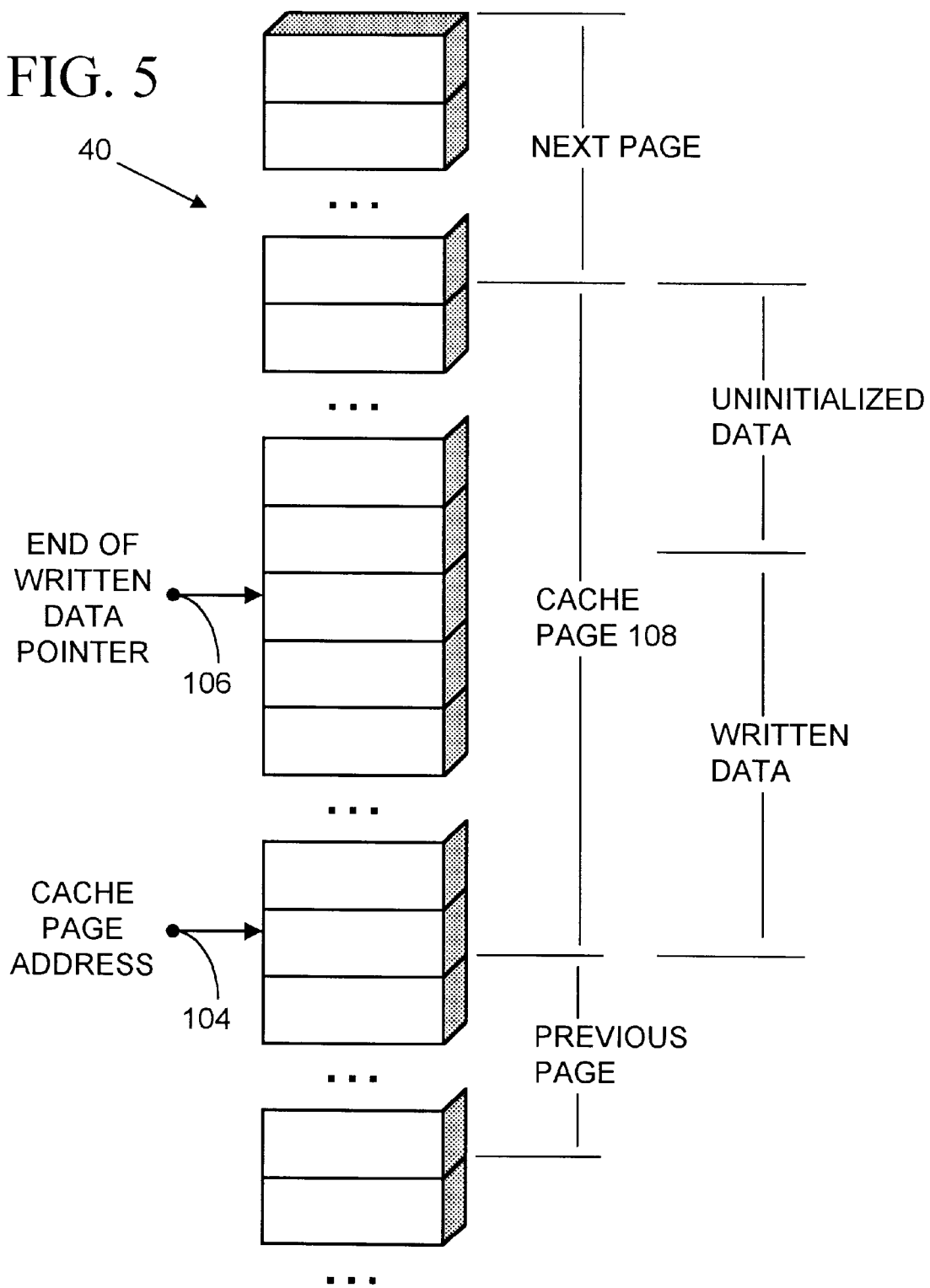
FIG. 5 is a block diagram of a portion of main memory of the computer system of FIG. 1 containing a cached page.

Referring to FIG. 5, by receiving the CachePageLocked value back from the copy-to-cache-page interface 94 (FIG. 4), the cache manager 60g (FIG. 4) is instructed to keep track of the cache page and the portion of the page that has been written so that the uninitialized data on the cache page can later be zeroed. For this purpose, the cache manager 60g comprises a cache page address 104 and an end-of-written-data pointer 106. The cache page address 104 indicates an address of the cache page 108 in the main memory 40. The end-of-written-data pointer 106 is a pointer to the end of the data that has been written into the cache page 108. In the preferred embodiment, the cache manager 60g tracks only a single cache page 108 in this state to conserve operating system memory usage. In alternative embodiments of the invention, more than one of cache page in this state can be tracked.

Referring again to FIG. 4, when a user mode thread later maps a file, the virtual memory manager 60e calls the zero-end-of-cache-page interface 98 of the cache manager 60g to ensure that any uninitialized data on any cache page for the file is zeroed. If any of these cache pages still contain uninitialized data, the cache manager 60g can have the uninitialized portion of the cache page zeroed. In a call to the zero-end-of-cache-page interface 98, the virtual memory manager 60e passes a FileObject parameter that indicates the file which is being mapped by a user mode thread. In the preferred embodiment, the zero-end-of-cache-page interface 98 is defined as follows (in C programming language syntax):

CcZeroEndOfCachedPage(FileObject)

In response to the call to its zero-end-of-cache-page interface 98, the cache manager 60g has the uninitialized data zeroed in the cache page 108 being tracked by the cache page address 104 and end-of-written-data pointer 106. After the uninitialized data is zeroed, the cache manager 60g calls the unlock-cache-page interface 96 of the virtual memory manager 60e to unlock the cache page 108. The cache page 108 must be unlocked before it can be written by the user mode thread. In the call to the unlock-cache-page interface 96, the cache manager 60g passes the address of the cache page 108 as a parameter. In the preferred embodiment, the unlock-cache-page interface 96 is defined as follows (in C programming language syntax):

MmUnlockCachedPage(PageAddress)

Through use of the interfaces 94, 96, and 98, the cache manager 60g and the virtual memory manager 60e can suppress zeroing of uninitialized data in cache pages of a mapped I/O file until the file is mapped by a user mode thread. A majority of the time, the cache manager 60g caches files mapped only by kernel mode threads. Accordingly, in a large percentage of files that are written, the cache manager 60g and virtual memory manager 60e write the files without zeroing uninitialized data in cache pages. Since mapping of cache pages containing uninitialized data by kernel mode threads does not pose a security risk, suppressing zeroing in this manner improves the efficiency of writing files using mapped file I/O without compromising security.

Having described and illustrated the principles of our invention with reference to a preferred embodiment, it will be recognized that the preferred embodiment can be modified in arrangement and detail without departing from such principles. For example, elements of the preferred embodiment shown in software may be implemented in hardware and vice versa. In view of the many possible embodiments to which the principles of our invention may be applied, it should be recognized that the detailed embodiments are illustrative only and should not be taken as limiting the scope of our invention. Rather, we claim as our invention all such embodiments as may come within the scope and spirit of the following claims and equivalents thereto.

We claim:

1. In a computer having a main memory, at least one secondary storage device, and a processor for executing kernel mode process threads and user mode process threads, an operating system comprising:

a file system for reading and writing of data in the form of files from the at least one secondary storage device;

a virtual memory manager in communication with the file system for managing read and write accesses to data in the main memory as a virtual memory, and for mapping input/output of files from the secondary storage device into the main memory on request of the kernel mode and user mode process threads;

a cache manager in communication with the virtual memory manager for controlling which pages of the files mapped by the virtual memory manager for the kernel mode and user mode process threads are cached in the main memory;

wherein the cached pages that are mapped to extend or create the files have uninitialized portions; and wherein the virtual memory manager and the cache manager operate cooperatively to zero the uninitialized portions of the cached pages that are mapped by the user mode process threads, and to delay zeroing of the uninitialized portion of at least one of the cached pages while mapped by a kernel mode process thread until said at least one cached page is mapped by at least one of the user mode process threads.

2. The operating system of claim 1 comprising:

a copy-to-cache-page interface of the virtual memory manager callable by the cache manager to cause the virtual memory manager to insert a specified page into a specified mapped file from an available page, and having a no-zeroing flag settable by the cache manager to indicate that any uninitialized portion of the specified page is not to be zeroed by the virtual memory manager until the specified file is mapped by any of the user mode process threads.

3. The operating system of claim 2 wherein:

the virtual memory manager is operative, responsive to a call of the cache manager to the copy-to-cache-page interface, to (a) zero the uninitialized portion of the specified page if the specified file is already mapped by any of the user mode process threads, and (b) suppress zeroing and lock the specified page in the main memory if the specified file is not yet mapped by any of the user mode process threads, and (c) return a status to the cache manager indicative of the specified page being in one of zeroed or locked states; and the cache manager is operative, responsive to the status being indicative of the specified page being in the locked state, to track which portion of the specified page is uninitialized.

4. The operating system of claim 3 comprising:

a zero-end-of-cached-page interface of the cache manager callable by the virtual memory manager when the specified file is mapped by one of the user mode process threads to cause the cache manager to cause zeroing of the portion of the specified page tracked as uninitialized.

5. The operating system of claim 4 comprising:

an unlock-cache-page interface of the virtual memory manager callable by the cache manager to cause the virtual memory manager to unlock the specified page tracked by the cache manager so as to allow the specified page to be subsequently written to the file.

6. In a computer having a main memory, at least one secondary storage device, and a processor for executing kernel mode process threads and user mode process threads, an operating system comprising:

a file system for reading and writing of data in the form of files from the at least one secondary storage device;

a virtual memory manager in communication with the file system for managing read and write accesses to data in the main memory as a virtual memory, and for mapping input/output of files from the secondary storage device into the main memory on request of the kernel mode and user mode process threads;

a cache manager in communication with the virtual memory manager for controlling which pages of the files mapped by the virtual memory manager for the kernel mode and user mode process threads are cached in the main memory; and a copy-to-cache-page interface of the virtual memory manager callable by the cache manager to cause the virtual memory manager to insert a specified page into a specified mapped file from an available page, and having a no-zeroing flag settable by the cache manager to indicate that any uninitialized portion of the specified page is not to be zeroed by the virtual memory manager until the specified file is mapped by any of the user mode process threads;

the virtual memory manager being operative, responsive to a call of the cache manager to the copy-to-cache-page interface, to (a) zero the uninitialized portion of the specified page if the specified file is already mapped by any of the user mode process threads, and (b) suppress zeroing and lock the specified page in the main memory if the specified file is not yet mapped by any of the user mode process threads, and (c) return a status flag to the cache manager indicative of the specified page being in one of zeroed or locked states;

the cache manager being operative, responsive to the return status flag being indicative of the specified page being in the locked state, to track which portion of the specified page is uninitialized;

a zero-end-of-cached-page interface of the cache manager callable by the virtual memory manager when the specified file that is locked is mapped by one of the user mode process threads to cause the cache manager to cause zeroing of the portion of the specified page tracked as uninitialized; and an unlock-cache-page interface of the virtual memory manager callable by the cache manager to cause the virtual memory manager to unlock the specified page tracked by the cache manager so as to allow the specified page to be subsequently written to the file;

whereby the virtual memory manager and the cache manager operate cooperatively to zero uninitialized portions of the cached pages that are mapped by the user mode process threads, and to delay zeroing of the uninitialized portion of at least one of the cached pages while mapped by a kernel mode process thread until said at least one cached page is mapped by at least one of the user mode process threads.

7. A method of mapped file input/output in an operating system for a computer having a main memory, at least one secondary storage device, and a processor for executing kernel mode process threads and user mode process threads, the method comprising:

on request of one out of the kernel mode and user mode process threads, mapping input/output of a file from the secondary storage device into a working set of cache pages in the main memory;

zeroing any uninitialized portion of the cache pages in which the file is mapped, wherein said zeroing comprises writing blanking data over the uninitialized portion of the cache pages in which the file is mapped and the cache pages remain mapped by a kernel mode process thread after zeroing; and suppressing the zeroing of the uninitialized portion of the cache pages in which the file is mapped while mapped by the kernel mode process thread until the file also is mapped by at least one of the user mode process threads.

8. The method of claim 7 comprising:

tracking the uninitialized portion of the file in at least one of the cache pages for later zeroing of the uninitialized portion when the file is mapped by at least one of the user mode process threads.

9. A computer readable medium having computer-executable instructions for performing the steps of the method in claim 7.

10. A computer readable medium having instructions executable on a computer having a main memory, at least one secondary storage device, and a processor for executing kernel mode process threads and user mode process threads, the instructions comprising:

a file system for reading and writing of data in the form of files from the at least one secondary storage device;

a virtual memory manager in communication with the file system for managing read and write accesses to data in the main memory as a virtual memory, and for mapping input/output of files from the second storage device into the main memory on request of the kernel mode and user mode process threads;

a cache manager in communication with the virtual memory manager for controlling which pages of the files mapped by the virtual memory manager for the kernel mode and user mode process threads are cached in the main memory; and wherein the virtual memory manager and the cache manager operate cooperatively to zero uninitialized portions of the cached pages that are mapped by the user mode process threads, and to delay zeroing of the uninitialized portion of at least one of the cached pages while mapped by a kernel mode process thread until said at least one cached page is mapped by at least one of the user mode process threads.

11. The computer readable medium of claim 10 wherein the instructions further comprise:

a copy-to-cache-page interface of the virtual memory manager callable by the cache manager to cause the virtual memory manager to insert a specified page into a specified mapped file from an available page, and having a no-zeroing flag settable by the cache manager to indicate that any uninitialized portion of the specified page is not to be zeroed by the virtual memory manager until the specified file is mapped by any of the user mode process threads.

12. The computer readable medium of claim 11 wherein:

the virtual memory manager is operative, responsive to a call of the cache manager to the copy-to-cache-page interface, to (a) zero the uninitialized portion of the specified page if the specified file is already mapped by any of the user mode process threads, and (b) suppress zeroing and lock the specified page in the main memory if the specified file is not yet mapped by any of the user mode process threads, and (c) return a status to the cache manager indicative of the specified page being in one of zeroed or locked states; and the cache manager is operative, responsive to the status being indicative of the specified page being in the locked state, to track which portion of the specified page is uninitialized.

13. The computer readable medium of claim 12 wherein the instructions further comprise:

a zero-end-of-cached-page interface of the cache manager callable by the virtual memory manager when the specified file is mapped by one of the user mode process threads to cause the cache manager to cause zeroing of the portion of the specified page tracked as uninitialized.

14. The computer readable medium of claim 12 wherein the instructions further comprise:

an unlock-cache-page interface of the virtual memory manager callable by the cache manager to cause the virtual memory manager to unlock the specified page tracked by the cache manager so as to allow the specified page to be subsequently written to the file.

15. In an operating system for a computer having a main memory, at least one secondary storage device, and a processor for executing kernel mode process threads and user mode process threads, a method of providing to a requesting process thread a cache page for mapped file input/output for appending data to a file beyond currently allocated pages, if any, the method comprising:

allocating from a free cache pool a cache page for mapping input/output of the file from the secondary storage device, the cache page having an uninitialized portion from a last use of the cache page;

mapping the cache page to virtual address space of the requesting process thread;

if the requesting process thread is a kernel mode process thread, delaying zeroing of the cache page until the cache page is also mapped into an address space of a user mode process thread; and when the cache is also mapped by one of the user mode process threads, zeroing the cache page by writing blanking data over the uninitialized portion of the cache page.

16. The method of claim 15 wherein the file is a new file created by the requesting process.

17. The method of claim 15 wherein the cache page has an end, the method further comprising:

writing data to the cache page up to a tracked endpoint with a kernel mode process thread, wherein the zeroing step comprises writing blanking data from the endpoint to the end of the cache page.

\* \* \* \* \*